Sept. 1, 1959     S. F. McCLATCHIE     2,902,209
FLOW THROTTLING CONTROLS FOR BLOWERS, TURBINES AND THE LIKE
Filed Aug. 24, 1956     2 Sheets-Sheet 1
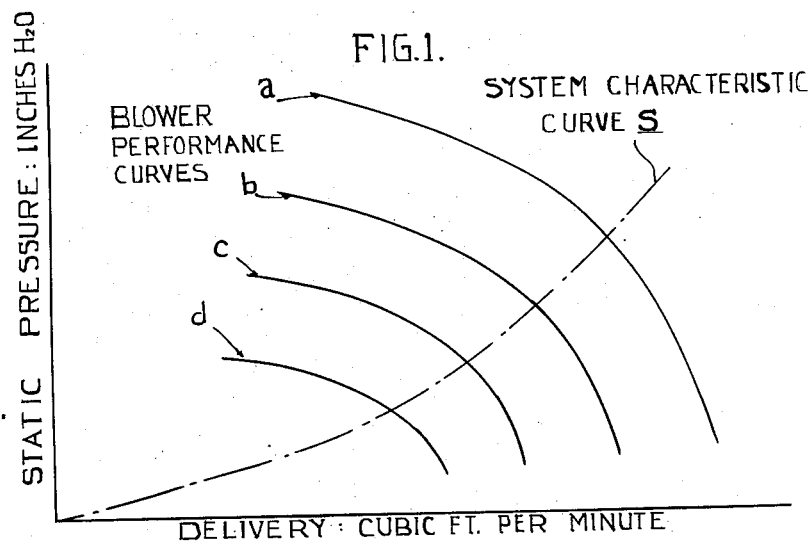
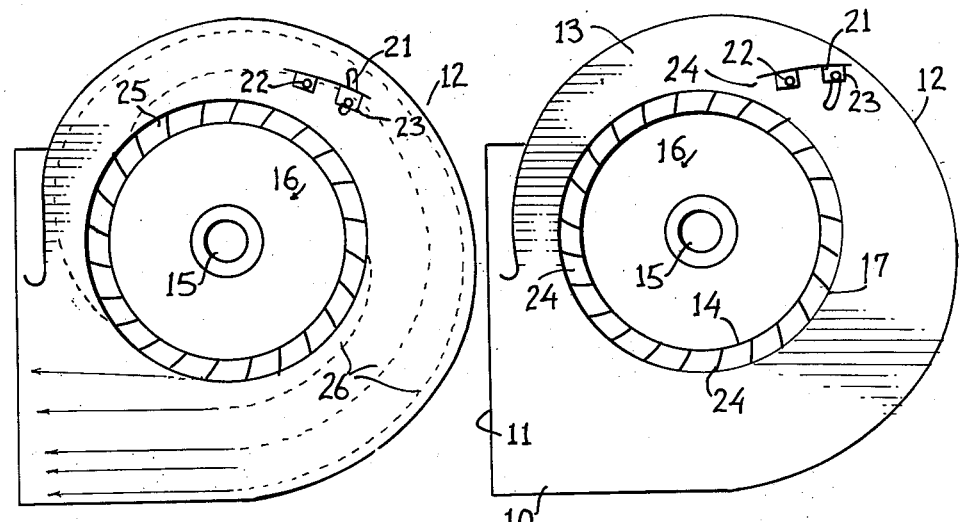
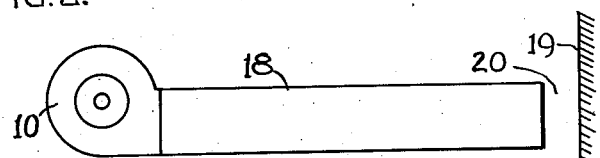
Inventor
SAMUEL FOSTER McCLATCHIE
by R. S. Filipkowski
Agent Sept. 1, 1959  S. F. McCLATCHIE  2,902,209
FLOW THROTTLING CONTROLS FOR BLOWERS, TURBINES AND THE LIKE
Filed Aug. 24, 1956  2 Sheets-Sheet 2
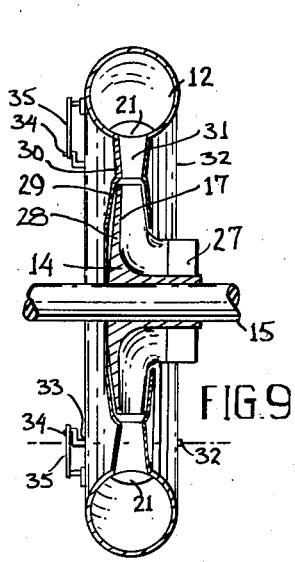
FIG.9.
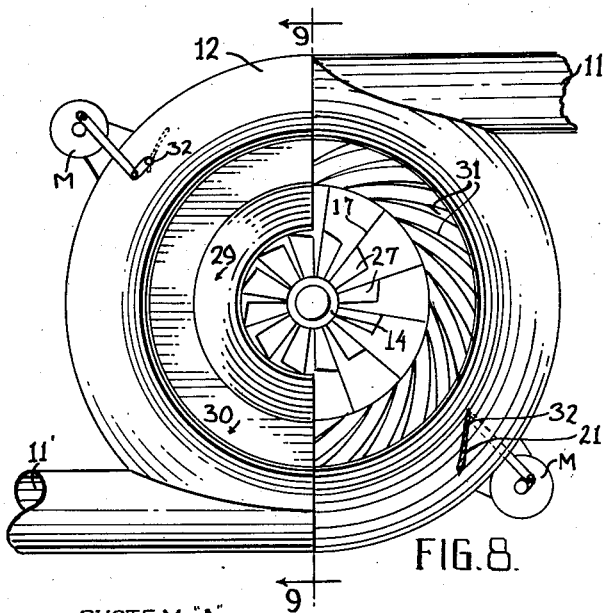
FIG.8.
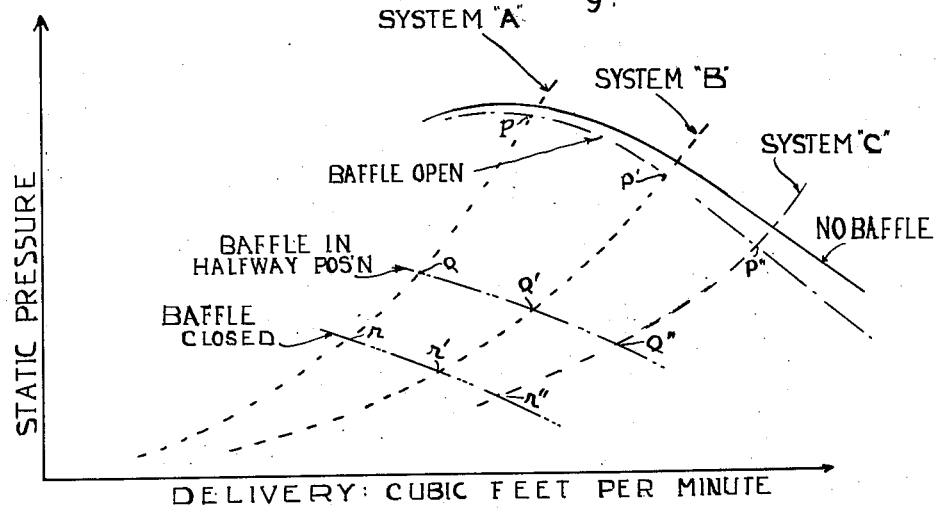
FIG.4.
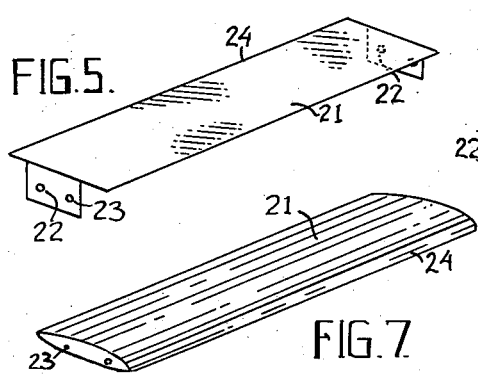
FIG.5.
FIG.7.
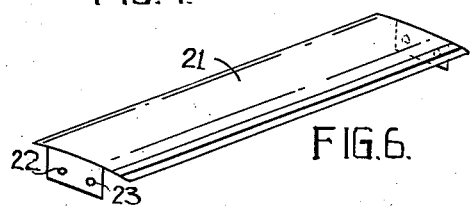
FIG.6.
Inventor
SAMUEL FOSTER McCLATCHIE
by R.J. Filipkowski
Agent

United States Patent Office 2,902,209
Patented Sept. 1, 1959

2,902,209

FLOW THROTTLING CONTROLS FOR BLOWERS, TURBINES AND THE LIKE

Samuel Foster McClatchie, Delhi, Ontario, Canada

Application August 24, 1956, Serial No. 606,051

5 Claims. (Cl. 230—114)

This invention concerns the control of flow of fluid through a system wherein the fluid moves relatively to an impeller of the radial type, and in particular concerns improvements in controls for regulating volume and pressure of flow delivered by centrifugal type blowers. In its broadest aspect the invention also extends to arrangements for controlling flow of fluid in a system where moving fluid does work by exchange of momentum with an impeller.

Such controls have utility in association with rotary bladed fluid-handling devices including fans, blowers, compressors, superchargers, pumps and turbines. More specifically, a control according to the invention takes the form of a baffle or vane interposed radially between a rotary impeller and a housing or chamber within which the impeller runs, the attitude or extent of such baffle or vane being adjusted with respect to the moving fluid for the purpose of effecting a variation in the throughput of the system at a pre-determined impeller rotational speed.

For purposes of illustration of the advantages and mode of use of the baffle according to the present invention the following description will deal specifically with such control devices associated with centrifugal blowers handling air.

Fluid handling devices of the class of fans, blowers, compressors, superchargers, and pumps, are generally designed to deliver a certain volume or mass of the fluid per unit time, whether it be air, gas, liquid, pulverulent flowable material, or mixtures of fluids, and to overcome the resistance to the flow offered by a delivery system comprising ducts. These devices may be associated with any of a wide variety of installations, as for example, household and industrial heating plants, process furnaces, air conditioning units, economizers, filters, and ventilating ducts. For each system there is usually stipulated a required delivery volume in cubic feet per minute, requiring that a definite static pressure or head be maintained at the delivery side of the fluid handling device. Whenever for any reason the flow and pressure require to be varied, it is necessary to re-design the blower system, or to make certain compromises. Heretofore prior art practices in this regard have included:

(a) By-passing the unwanted or excess quantity of fluid delivered by the blower;

(b) Controlling the area of the discharge duct, as by shutters or sliding panels;

(c) Controlling the area of the intake aperture of the blower, as by systems of shutters or moveable closures;

(d) Varying the resistance of a suction duct ahead of the blower by a damper or by constriction of duct cross-sectional area;

(e) Varying the speed of the blower by using variable-speed motors and/or drives.

All of the methods listed above may be shown to have disadvantages including increased expense of installation, higher consumption of power, or waste of unwanted or excess flow. For example, the use of series resistances for reducing motor speed in the case of motors that can be so controlled is inefficient and may cause overheating of the motor winding or of the resistance elements. Belt and pulley systems for use with constant speed motors to provide more than one operating speed for the impeller add to the initial cost, as do more complicated variable diameter pulleys or sheaves.

By the present invention, a vane or damper is provided between the impeller and scroll case, which may be so varied in its position and relation to the structure in the current of air that the output of the blower is effectively modified to some fraction of its maximum delivery capacity. By the practice of the invention variable delivery is simply achieved by rotating or moving the vane or damper through a relatively small arc or displacement, to impose a restriction or obstruction upon part of the flow within the housing, while leaving unobstructed the remainder of the flow path therein.

It is therefore an object of this invention to provide simple yet effective flow-controlling means for fluid-handling devices employing bladed impellers of the radial-flow type, which are economical to manufacture.

It is another object of the invention to provide in rotary impeller radial-flow fluid handling devices, control baffles which may readily be adapted or fitted to conventional blowers, fans, and the like devices.

The present invention is specifically described in conjunction with the accompanying drawings, wherein:

Fig. 1 is a general graphical presentation of four blower-performance characteristic curves, obtained at different impeller speeds, included to assist in the description of the invention;

Fig. 2 is a sectional view of a conventional radial type of blower showing a baffle control according to the invention fitted within the scroll case and lying in neutral position;

Fig. 3 shows the blower of Fig. 2 with the control baffle rotated into closed position;

Fig. 4 describes experimental results obtained with a conventional blower operated at substantially constant impeller rotational speed employing a baffle control device tested at different positions with a series of delivery systems;

Fig. 4a is a diagram in reduced scale illustrating the test setup employed in obtaining the data of Fig. 4;

Figs. 5, 6, and 7 illustrate perspective views of a number of possible baffle structures;

Fig. 8 is an elevation side view of a supercharger fitted with baffle controls; and, Fig. 9 is a section taken on line 9—9 of the supercharger shown in Fig. 8.

The control system according to the invention is intended for use in any of the impeller type devices indicated hereinbefore, and in particular has its preferred use in a radial flow blower 10, as in Figures 2 and 3, having a tangential discharge through the aperture 11 and axial inflow along the spin axis. Such devices conventionally comprise a scroll-case 12 having end closures such as 13 which are circularly apertured coaxially with a cylindric impeller 14 rotatable about a shaft 15 journalled suitably in bearings (not shown). A blade-support disc 16 may be formed within the impeller intermediate the ends thereof. The blades 17 are mounted parallel with the shaft 15 and are disposed at an angle to a radial plane passing through each blade and may be suitably curved.

In the case where the impeller is motor driven at substantially constant speed, the relationship of flow volume delivered to static pressure or head at the discharge side is definable by points along curve A of Fig. 1. The curve generally shows that when the delivery head is reduced to its least value, as by allowing the blower to discharge freely into the air, the highest rate of flow is achieved. When a certain obstruction or resistance load is offered to the blower by the delivery system, there is a condition at which such constant-speed blower realizes its highest delivery pressure. When the resistance is increased beyond this point the static head and the flow volume are both reduced.

If the speed of the impeller 14 is reduced to a second substantially constant value as by using an electrical drive motor of different synchronous speed, the blower will exhibit volume/pressure characteristics defined by another curve B having lesser amplitude than in the foregoing. In a similar manner as the speed is changed to still lower values other curves of decreased amplitudes may be found, as C and D, indicating performances to be expected of a conventional blower at such speeds. It is to be noted that such curves as are illustrated are intended to be only generally descriptive and do not attempt to correct for slip or imperfect speed regulation with load on the part of the motor.

For a given discharge condition wherein a fixed shape and length of duct or other flow guiding element contributing resistance forms the delivery system, an operating point will be established for each speed on each of the curves A, B, C, D. A line S passed through the points is essentially a parabolic curve passing through the zero delivery and zero pressure points, and represents the system characteristic.

Variation of blower performance with a given delivery system has heretofore been accomplished by the prior art techniques indicated above, wherever different flow and/or pressure conditions are desired, as for example in a household warm air furnace equipped for winter heating and summer air circulation. Applicant has found that the concept of interposing an impedance or obstruction within the blower itself to control flow may be readily realized and that variation over a practical range of delivery may be achieved with extremely simple and positively acting baffle or vane elements 21. The operation of such baffles 21 according to the invention may be understood by referring to Figs. 4 and 4a, dealing with test results obtained with an embodiment of the invention.

The test was carried out in accordance with Plate I Specification of the National Association of Fan Manufacturers, with a blower 10 fitted to a duct 18 of cross-sectional area equal to the area of discharge aperture 11, and of a predetermined length. An obstructing panel 19 normal to the axis of the duct is spaced an adjustable distance from the end of the duct to leave an opening 20 whereby to simulate a resistance or system load. System "A" was represented by a spacing 20 of 1.50 inches, that of "B" by a spacing 2.25 inches, and system "C" by 3.50 inches. A capacitor-type A.C. motor used to drive the blower had a speed regulation range between no load and full load conditions within ten percent of the rated no load speed. For system "A" the fan-law curve was found by establishing points $p$, $q$, and $r$, by adjusting the baffle 21 within the scroll, pivoting about points 22 in the end tabs. With the baffle open at a position whereby the least disturbance of normal flow is effected, a point $p$ on the curve is determined from measurements of the pressure and volumetric flow in duct 18, obtained by means well known in the art. Similarly, points $q$ and $r$ are located, determining the system performance for the half-closed and fully-closed baffle positions. Similar results are plotted for the simulated systems "B" and "C," to establish the curves containing the points $p'$, $q'$, and $r'$, and $p''$, $q''$, $r''$. It will be apparent that a volume reduction of more than thirty percent of the maximum possible flow is achieved by a simple vane according to the invention located at the peripheral position shown.

Although it is difficult to determine precisely what effects a given vane produces in the current within the scroll case, applicant is of the opinion, which is not intended as being in any way limitative of the invention, that the baffle tends to impede normal flow patterns and to establish either turbulence or flow construction giving rise to eddies, or both, all of which in greater or lesser degree modify the capacity of the blower. In particular, that part of the blower periphery lying upstream of the vane in the current is observed to be reduced in its effectiveness depending on the degree that baffle 21 obstructs such flow. It may be observed that in a conventional blower the cylindric impeller 14 rotates about its axis in shaft 15 in the direction in which the scroll case clearance increases as indicated by the arrow. The blades 17 are disposed at angles to radial planes so that their leading edges 24 lie peripherally ahead in the direction of rotation. In the normal course of operation, assuming relatively free discharge of air by apertures such as 25, the air enters the impeller 14 axially and moves radially outwardly under the impetus of blade movement which throws the air outward and gives it a tangential component of motion. The net flow of all such streams 26 as indicated by the dotted lines in Figure 2 within the scroll-shaped collector or housing is confined between the end walls and is led to the discharge aperture in an orderly manner. This flow may be idealized for purposes of description by assuming that the average flow streamlines are smooth spirals commencing from the impeller and terminating as straight flow lines at the discharge duct. The walls are assumed to be perfectly smooth and the form and pitch of the blades precisely suited to achieve a negligible turbulence in the flow. Consequently each flow sheet is urged along a respective curved path 26.

If now into this non-turbulent flow a slender elongate curved sheet body 21 be inserted and supported in such manner that its curvature is tangent to the flow streamlines and its length parallel with the impeller axis, such body if ideally thin would have no disturbing effect and the blower would deliver the same volumetric flow as before. Referring to Figure 4, the curves $p$, $p'$, $p''$ represents the practical condition wherein the baffle may introduce only a slight loss in performance in the open position as exemplified by Fig. 1.

Inasmuch as the conventional blower design involves a shape of scroll case such that about three-quarters of the periphery of the impeller is effective to launch curved flow sheets into the spiral trajectories 26, it will be apparent that the body 21 may be positioned anywhere along the current within an arc of about two hundred and fifty degrees of the scroll case periphery. In such positions, if its attitude remains such that the curvature transversely to the baffle length conforms to the curvature of the flow sheet along which it lies there will be substantially least disturbance of the total flow.

If the body be rotated in the stream as shown in Figure 3 about an axis passed through the opposed end tabs 22 parallel with the impeller axis, so that the body is thereby disposed with the leading edge 24 presented to the flow at a point which lies radially inwardly of the trailing edge, it will impede the flow. By virtue of the airfoil characteristics of a body in such attitude within a flow of air, some of the streamlines will be bent towards the impeller, i.e., with a reverse component of radial flow. In effect the flow diverted around the leading edge will react upon the portions of the flow moving through the impeller blading both upstream and downstream of the body, with the effect that the discharge is modified. If the body is rotated in the stream as before but in a reverse direction so that the leading edge 24 lies radially outwardly of the scroll case with respect to its trailing edge, there will also be an effect to obstruct the flow whether by crowding the streamlines between the trailing edge and the impeller, or by turbulence set up, or both.

Numerous forms of impedance may be devised within the scope of the invention for obstructing the flow. For example the baffles in Figs. 5, 6 and 7 may be employed, including the straight strip, the curved strip, and thick airfoil types. Numerous other forms will readily suggest themselves, and these need not necessarily be pivotable about an axis parallel with the impeller axis, but may be slidable radially or at an angle to a radial plane into the scroll case. In addition, a baffle extending the whole width of the scroll case need not necessarily always be used inasmuch as a baffle whose length is only a fraction of the blower width will be found effectual in some application.

It moreover lies within the scope of the present invention to realize a baffle control comprising multiple elements, or an element which is movable about the periphery of the impeller, or combinations of the foregoing. Numerous provisions for holding a given setting of the vane 21 will readily occur to those skilled in the art. For example, a bolt may be passed through a hole 23 in tab 22 and through a slot in the end wall of the impeller housing, and secured as by a wing nut or other suitable fastening.

The use of baffle or vane flow control devices is not necessarily limited to fluid handling devices where the blading discharges directly into the scroll or housing, but may be practiced in those cases where a set of stationary guide vanes lie between the impeller and the housing and serve to direct the air along the direction of flow.

In Fig. 8 a rotary supercharging device is shown comprising a shaft 15 having fixed thereon a spinner or impeller 14 including radially disposed blades 17 and a pre-spinner 27. The blades are fixed to a radially extending flange or disc 28 integral with the impeller. The outer ends of the blades run in an annular channel 29 and are shrouded thereby. Between the shroud 29 and a collector housing 12 there is interposed an annular channel 30 within which a series of blades 31 lie each at an angle to a radial plane to receive the air thrown by the blades 17 with a minimum of impact loss and to provide a pressure increase by diffusor action before it enters housing 12. In the supercharger illustrated a pair of exit apertures 11 and 11' disposed 180° apart are provided, communicating with ducts leading the compressed air to the cylinders of an aircraft engine (not shown) for example. Interposed within the housing 12 and externally of the guide vanes 31 are one or more baffles 21. Each baffle pivots about an axis 32 parallel with the shaft 15 and includes an axle 33 having a crank 34 thereon. A link 35 coupled to the cranks is driven by a setting motor M which is under the control of an operator or is responsive to automatic servo devices (not shown). As the baffles are rotated out of the position in which they are aligned with the circulating flow within the housing a portion of the guide vane periphery will be obstructed or the flow therefrom will be impeded to effectively reduce the pressure or volume of air delivered through the ports 11 and 11'.

While the present description has illustrated the exemplary embodiments of an air blower or supercharger wherein the impeller blades are forwardly curved in the direction of rotation, or straight radially bladed blowers or blowers having backwardly sloped blades may also be controlled by interposing impedance elements within the scroll or ring housing.

I claim:
1. In a fluid handling device of the type comprising a flow guiding housing having one curved wall of scroll shape joined with a pair of opposed apertured plane parallel side walls, a cylindrical bladed impeller rotatable in said housing about an axis transverse to said walls for urging fluid radially outwardly from the impeller and peripherally along a channel formed between said scroll wall and said impeller, said channel commencing at a cut-off point and increasing in cross-sectional area for a distance corresponding substantially to three-quarters of the impeller periphery and terminating in a discharge aperture between the ends of said scroll wall, the improvement comprising a throttling control in the form of a baffle located in and movable in the peripheral flow of fluid within said channel with respect to said housing, and disposed between a first limit position and a second limit position respectively about 40 and about 250 degrees downstream of the cut-off point as measured between radial planes intersecting the cut-off point and said limit positions and passing through the blower axis.

2. A throttling control as in claim 1 wherein said baffle comprises a vane rotatable about an axis transverse to said side walls.

3. A throttling control as in claim 1 wherein said baffle is a planar body movable radially of said impeller.

4. A throttling control as in claim 1 wherein said baffle is a body guided for movement through an opening in one side wall of the housing.

5. A throttling control as in claim 1 wherein said baffle comprises a symmetric airfoil rotatable about a longitudinal axis in the airfoil disposed transversely between the said side walls.

References Cited in the file of this patent

UNITED STATES PATENTS

| | | |
|---|---|---|
| 1,401,668 | Brown et al. | Dec. 27, 1921 |
| 2,645,411 | Andler | July 14, 1953 |
| 2,719,666 | Hollingsworth et al. | Oct. 4, 1955 |

FOREIGN PATENTS

| | | |
|---|---|---|
| 30,288 | Sweden | Feb. 11, 1911 |
| 50,411 | France | Jan. 11, 1939 |
| 731,822 | Great Britain | June 15, 1955 |
| 733,286 | Germany | Sept. 1, 1935 |